Feb. 23, 1926.  1,574,102
R. R. McGREGOR
RADIATOR FENDER FOR AUTOMOBILES
Filed May 25, 1925  2 Sheets-Sheet 1

Inventor:
Robert Ray McGregor,
By Samuel N. Pond, Atty.

Feb. 23, 1926. 1,574,102
R. R. McGREGOR
RADIATOR FENDER FOR AUTOMOBILES
Filed May 25, 1925  2 Sheets-Sheet 2
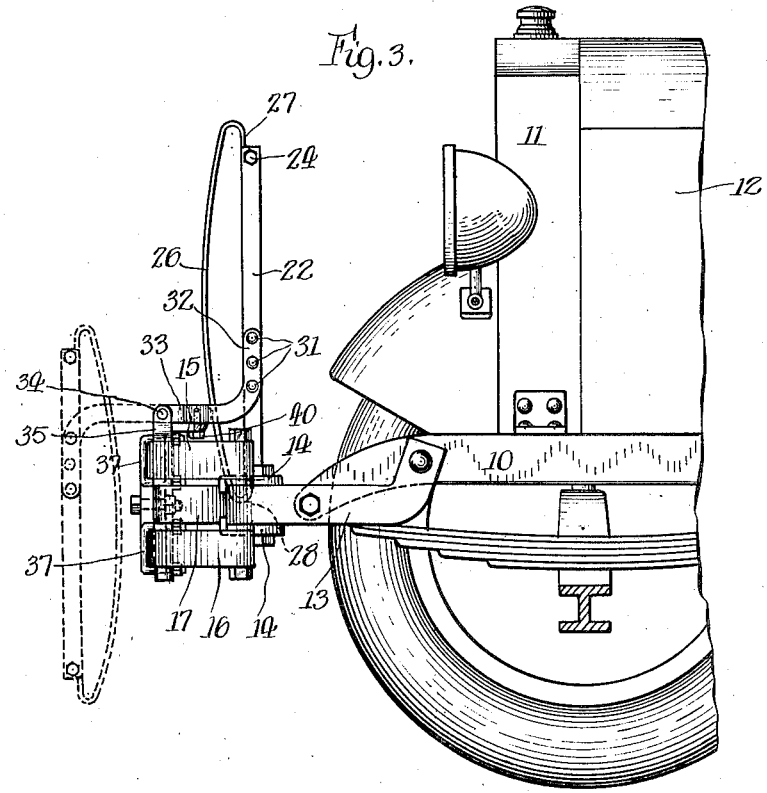
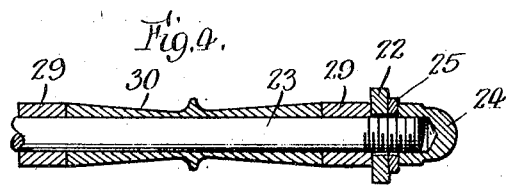
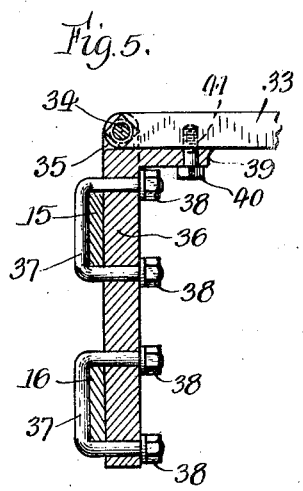
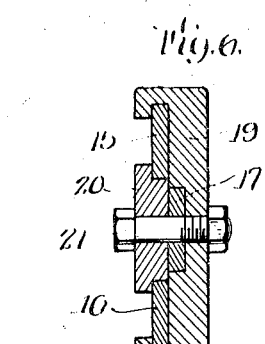
Inventor:
Robert Roy McGregor,
By Samuel N. Ford Atty.

Patented Feb. 23, 1926.

1,574,102

UNITED STATES PATENT OFFICE.

ROBERT ROY McGREGOR, OF CHICAGO, ILLINOIS.

RADIATOR FENDER FOR AUTOMOBILES.

Application filed May 25, 1925. Serial No. 32,578.

*To all whom it may concern:*

Be it known that I, ROBERT ROY MC-GREGOR, a citizen of the United States, residing at Chicago, in the county of Cook and State of Illinois, have invented certain new and useful Improvements in Radiator Fenders for Automobiles, of which the following is a specification.

This invention relates to protective devices for automobiles and has reference more particularly to an improved radiator guard or fender.

The principal object of the invention is to provide a simple, inexpensive and efficient radiator guard or fender that may readily be attached to and wholly supported by any of the well-known forms of automobile bumpers in common use, although being more especially designed and adapted for application to bumpers of the multiple flat bar type, and that shall be capable of being readily moved, without being detached from the bumper, from its normal operative position in front of the radiator to a lowered position wherein access may be readily had to the front of the car for cranking the motor or other purposes.

Other objects and attendant advantages of the invention will be apparent to persons skilled in the art from the following detailed description, taken in connection with the accompanying drawings wherein I have illustrated one practical and approved embodiment of the invention, and in which—

Fig. 3 is a side elevation of Fig. 1, viewed from the right of the latter figure;

Fig. 4 is an enlarged longitudinal section in the plane of one of the tie-rods of the fender frame, showing one of the spacing spools between adjacent spring fender bars;

Fig. 5 is an enlarged vertical section on the line 5—5 of Fig. 1; and

Fig. 6 is an enlarged vertical section on the line 6—6 of Fig. 1.

Figure 2:
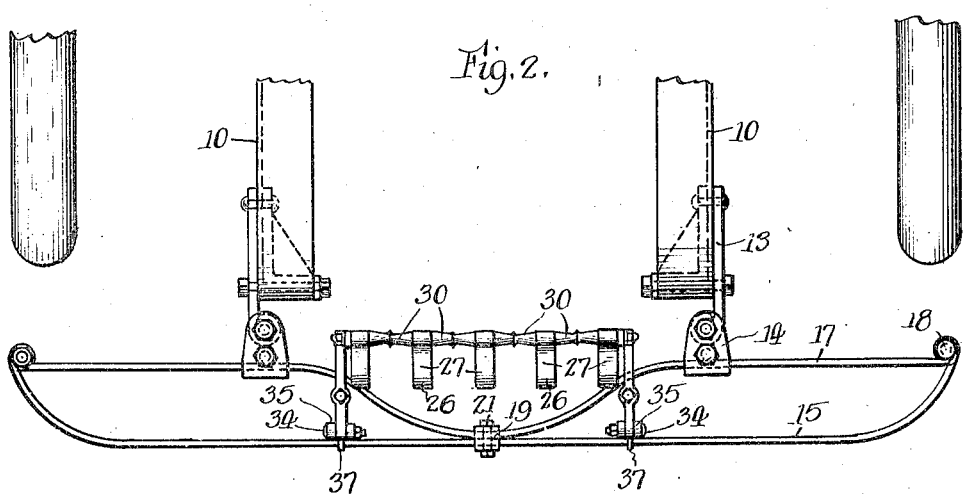
Fig. 2 is a top plan view of the bumper and fender shown in Fig. 1.

In the drawings, 10 designates each of the usual side frame bars of an automobile chassis, and 11 a conventional form of a radiator located just in advance of the usual engine hood or bonnet 12. Attached to the front ends of the side frame members 10 by forwardly extending arms 13 and clips 14 is an automobile bumper of a well-known type comprising upper parallel flat bars 15 and 16 and an intermediate flat bar 17 rearwardly offset from the vertical plane of the front bars 15 and 16, as clearly shown in Fig. 2, and united to the latter at its ends by bolts 18 and at its center by an embracing clip 19 (Fig. 6), clamp washer 20, and clamp bolt 21. The clips 14 are connected to the intermediate bar 17, as clearly shown in Figs. 2 and 3. The specific form and structure of bumper herein shown and above briefly described is substantially old and known, and no claim thereto, per se, is made herein.

Figure 1:
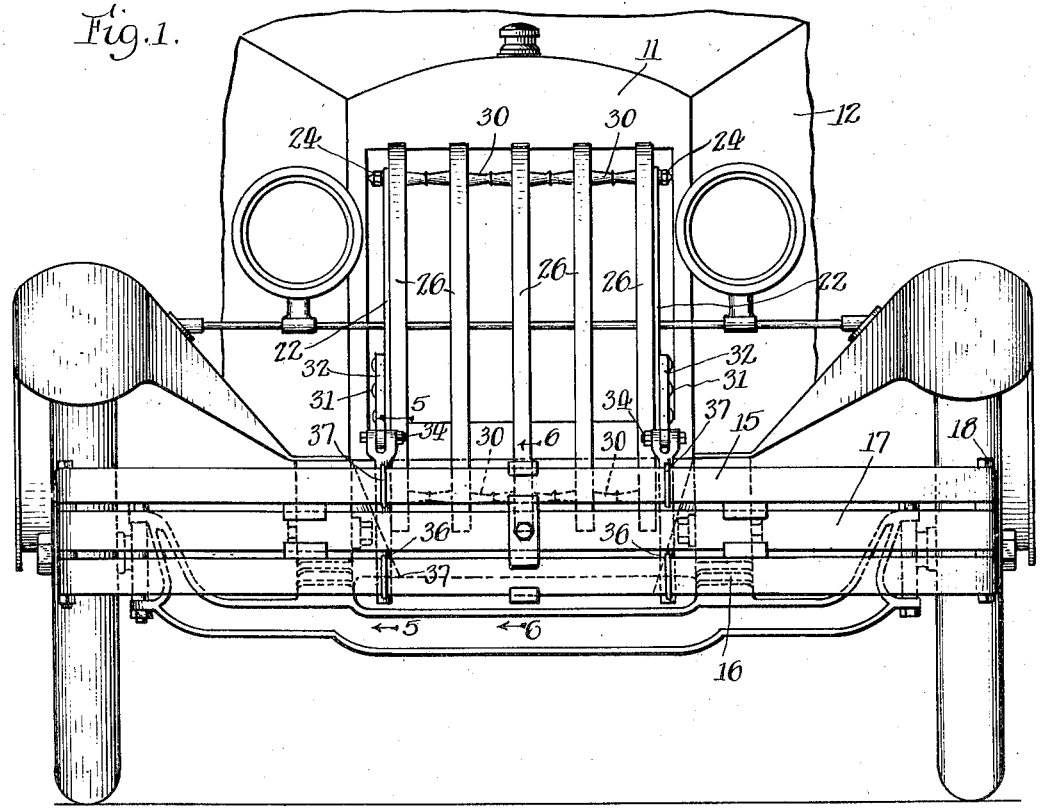
Fig. 1 is a front elevation of an automobile equipped with a bumper of the multiple flat bar type showing my improved radiator fender mounted thereon.

The grid structure of the guard or fender herein shown is substantially identical with that disclosed in an earlier application filed by me on the 28th day of March, 1925, Serial No. 18,963, and comprises the following parts. 22 designates each of a pair of flat vertical side bars, which are connected at top and bottom by horizontal tie-rods 23 passing therethrough and secured by nuts 24 and washers 25 (Fig. 4). Mounted and supported upon the upper and lower tie-rods 23 are a plurality of uniformly spaced vertically disposed spring fender bars 26 that are slightly bowed forwardly from top to bottom and terminate in upper and lower rearwardly bent loop portions 27 and 28, the ends of which are curled around the tie-rods 23, as clearly shown at 29 in Fig. 4. The spring fender bars are rigidly spaced by means of spacing sleeves 30 mounted on the tie-rods 23 between adjacent fender bars, all as clearly shown in Figs. 1, 2 and 4.

The specific structure of fender or shield above described is not essential to the carrying out of the present invention and may be substituted by any other form or structure of grid equally well adapted for the application thereto of the hinged fender supporting means next described.

To each of the upright side members 22 of the grid frame is strongly attached by bolts 31 the vertical arm 32 of an elbow member, the horizontal arm 33 of which extends forwardly of the vertical plane of the grid frame. The free end of the horizontal arm 33 is hinged by a pivot bolt 34 in a forked hinge lug 35 on the upper end of a bracket 36 that is disposed vertically across the bumper bars 15 and 16 and is rigidly attached to the latter by U-bolts 37 straddling the bumper bars 15 and 16 and passed through bolt holes in the bracket 36 and secured by nuts 38. On the upper end of the bracket 36 is a short rearwardly extending horizontal ledge or flange 39 apertured for the passage of a screw 40 that engages with a tapped hole 41 in the lower side of the horizontal arm 33 of the elbow member. The ledges or flanges 39 form a substantial rest or support for the elbow members that carry the fender grid, preventing the latter from tilting rearwardly under thrusts on the fender bars 26, and the screws 40 manifestly securely lock the elbow members in a position wherein the grid is maintained in normal upright position in front of the radiator, as shown in Fig. 3. When, however, the driver may be compelled to crank the motor, or to obtain access to the front of the car for any other purpose, it is necessary only to withdraw the two locking screws 40, whereupon the entire grid frame and its two elbow supports may be swung forwardly and downwardly to the position indicated by dotted lines in Fig. 3, thereby facilitating access to the front of the car. Reverse swing of the grid and the reapplication of the locking screws 40 manifestly restores the guard to normal operative position. By reference to Fig. 5 it will be seen that the legs of the U-bolts 37 pass through holes in the brackets 36 and are of just sufficient width to straddle the bumper bars 15 and 16, thereby avoiding the necessity of aperturing the latter for the application of the fender to the bumper. By reason of this construction, the brackets can be applied and removed by the simple operation of applying and removing the nuts 38 of the U-bolts, while the fender itself may be readily applied to and removed from the brackets by applying and removing the hinge bolts 34 and the locking screws 40. The attachment of the device to the bumper is, therefore, an extremely simple matter.

While I have herein shown and described one simple and practical physical embodiment of the principle of my invention, it is manifest that the invention is in no wise limited to either the specific form of bumper or the specific form of fender grid shown and described, but resides rather in the novel means for mounting the grid on the bumper with capacity of being swung downwardly out of the way; and, since this mounting means may be variously modified in structural details without departing from the operative principle thereof, I do not limit the invention to the structural details disclosed for the purposes of illustration, except to the extent indicated in specific claims.

I claim—

1. In combination with a vehicle bumper, a radiator fender pivotally mounted on said bumper, and means for supporting said fender in operative position in front of the radiator.

2. In combination with a vehicle bumper, a radiator fender pivotally mounted on said bumper, and means for supporting and locking said fender in operative position in front of the radiator.

3. In combination with a vehicle bumper, a radiator fender horizontally hinged at its lower portion on said bumper, and means supporting said fender upright against thrusts tending to tilt the same rearwardly.

4. In combination with a vehicle bumper, a radiator fender horizontally hinged at its lower portion on said bumper, means supporting said fender upright against thrusts tending to tilt the same rearwardly, and means for locking said fender in upright operative position.

5. The combination with a vehicle bumper, and a radiator fender, of brackets attached to said bumper, and arms attached to said fender and pivoted on said brackets.

6. The combination with a vehicle bumper, and a radiator fender, of brackets attached to said bumper, and forwardly extending arms on said fender pivotally connected to and supported on said brackets.

7. The combination with a vehicle bumper, and a radiator fender, of brackets attached to and projecting above said bumper, forwardly extending arms on said fender pivotally connected to and supported on the upper ends of said brackets, and means for locking said arms to said brackets.

8. The combination with a vehicle bumper, and a substantially rectangular radiator fender, of brackets attached to and projecting above said bumper and formed with rearwardly extending ledges, and elbow members attached to the upright side frame members of said fender and having forwardly projecting arms pivoted to the upper ends of said brackets and resting upon the ledges of the latter.

9. The combination with a vehicle bumper, and a substantially rectangular radiator fender, of brackets attached to and projecting above said bumper and formed with rearwardly extending ledges, elbow members attached to the upright side frame members of said fender and having forwardly projecting arms pivoted to the upper ends of said brackets and resting upon the ledges of the latter, and locking screws connecting said arms to said ledges.

10. The combination with a vehicle bumper having upper and lower flat bumper bars, and a substantially rectangular radiator fender, of brackets attached to and crosswise of said bumper bars and projecting above the latter and formed on their upper ends with rearwardly extending ledges, elbow members attached to the upright side frame members of said fender and having forwardly projecting arms pivoted to the upper ends of said brackets and supported upon the ledges of the latter, and locking screws passed through said ledges and into the under sides of said arms.

ROBERT ROY McGREGOR.